United States Patent
Harle et al.

(10) Patent No.: US 7,179,366 B2
(45) Date of Patent: Feb. 20, 2007

(54) CATALYST BASED ON A GROUP VI METAL AND A GROUP VIII METAL AT LEAST PARTIALLY PRESENT IN THE FORM OF HETEROPOLYANIONS IN THE OXIDE PRECURSOR

(75) Inventors: Virginie Harle, Lamorlaye (FR); Catherine Martin, Lille (FR); Edmond Payen, Jenlain (FR); Carole Lamonier, Armentieres (FR); Pascal Blanchard, Hulluch (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 209 days.

(21) Appl. No.: 10/631,966

(22) Filed: Aug. 1, 2003

(65) Prior Publication Data

US 2004/0132614 A1 Jul. 8, 2004

(30) Foreign Application Priority Data

Aug. 1, 2002 (FR) .................................. 02 09840

(51) Int. Cl.
*C10G 11/02* (2006.01)
*C10G 11/04* (2006.01)
*B01J 21/00* (2006.01)
*B01J 23/00* (2006.01)
*C01G 47/00* (2006.01)

(52) U.S. Cl. .................. 208/123; 208/124; 208/111.3; 208/111.35; 502/74; 502/255; 502/258; 502/259; 502/260; 502/261; 502/262; 502/307; 502/314; 502/315; 502/316; 502/317; 502/321; 502/322; 502/323

(58) Field of Classification Search ................. 502/255, 502/258–262, 307, 314–317, 321–323, 355, 502/415, 439, 74; 208/111.3, 111.35, 123, 208/124
See application file for complete search history.

(56) References Cited

U.S. PATENT DOCUMENTS

| | | | | |
|---|---|---|---|---|
| 4,290,922 A | * | 9/1981 | Umemura et al. ........... 502/243 |
| 4,404,397 A | * | 9/1983 | Daniel ......................... 562/546 |
| 4,439,236 A | * | 3/1984 | Ray ............................ 148/334 |
| 4,564,511 A | * | 1/1986 | Desmond et al. ........... 423/705 |
| 4,576,653 A | * | 3/1986 | Ray ............................ 419/61 |
| 4,720,575 A | * | 1/1988 | Gruber ........................ 560/214 |
| 4,863,887 A | | 9/1989 | Ohtake et al. |
| 5,990,348 A | * | 11/1999 | Lyons et al. ................. 562/549 |
| 6,043,184 A | * | 3/2000 | Karmakar et al. .......... 502/208 |
| 6,060,419 A | * | 5/2000 | Wijesekera et al. ......... 502/208 |
| 6,090,745 A | * | 7/2000 | DuBois et al. .............. 502/313 |
| 6,332,976 B1 | * | 12/2001 | Mignard et al. ............ 208/217 |
| 6,387,841 B1 | * | 5/2002 | Devlin et al. ............... 502/208 |
| 6,436,280 B1 | * | 8/2002 | Harle et al. ............. 208/216 R |
| 6,541,417 B2 | * | 4/2003 | Kasztelan et al. .......... 502/325 |
| 6,723,349 B1 | * | 4/2004 | Hill et al. ................... 424/604 |

FOREIGN PATENT DOCUMENTS

EP 0271337 A 6/1988
FR 2764211 A 12/1998

OTHER PUBLICATIONS

Pettiti I et al :"Anderson-type heteropoloxomolybdates in catalysis—2. EXAFS study on gamma—A1203- supported MoI, Co and Ni sulfided phases as HDS catalysts" Applied Catalysis A : General, Elsevier Science , Amsterdam, NL, vol. 220, No. 1-2, Oct. 25, 2001, pp. 113-121.

* cited by examiner

Primary Examiner—Cam N. Nguyen

(57) ABSTRACT

A catalyst contains at least one group VIII element and at least molybdenum and/or tungsten, said elements being present at least in part in the catalyst in the dry state in the form of at least one heteropolyanion with formula $M_xAB_6O_{24}H_6C_{(3-2x)}$, $tH_2O$; $M_xAB_6O_{24}H_6C_{(4-2x)}$, $tH_2O$; $M_xA_2B_{10}O_{38}H_4C_{(6-2x)}$, $tH_2O$; $M_xA_2B_{10}O_{38}H_4C_{(8-2x)}$, $tH_2O$; or $M_xA_2B_{10}O_{38}H_4C_{(7-2x)}$, $tH_2O$, in which M is cobalt and/or nickel and/or iron and/or copper and/or zinc, A is one or two elements from group VIII of the periodic table, B is molybdenum and/or tungsten and C is an $H^+$ ion and/or a $(NR_1R_2R_3R_4)^+$ type ammonium ion, in which $R_1$, $R_2$, $R_3$ and $R_4$, which may be identical or different, correspond either to a hydrogen atom or to an alkyl group and/or caesium and/or potassium and/or sodium, t is a number between 0 and 15 and x takes a value in the range 0 to 4 depending on the formula.

14 Claims, No Drawings

CATALYST BASED ON A GROUP VI METAL AND A GROUP VIII METAL AT LEAST PARTIALLY PRESENT IN THE FORM OF HETEROPOLYANIONS IN THE OXIDE PRECURSOR

The present invention relates to the field of catalysts containing at least one group VI element and at least one group VIII element and optionally associated with a porous matrix. One of the essential characteristics of the catalysts envisaged in the present invention is the at least partial presence of said elements from groups VI and VIII in the form of a heteropolyanion in the oxide precursor used to prepare said catalysts. The association within the same heteropolyanion molecule of at least one group VIII element and at least one group VI element produces a strong interaction in the oxide precursor between the group VIII element or elements and the group VI element or elements.

The present invention also relates to the use of said catalysts in hydrorefining and/or hydroconversion of hydrocarbon feeds such as petroleum cuts, cuts from coal or hydrocarbons produced from natural gas, more particularly from hydrocarbon feeds containing heteroatoms. Hydrorefining includes hydrogenation, hydrodenitrogenation, hydrodeoxygenation, hydrodearomatization, hydrodesulphurization, hydrodemetallization, hydroisomerization, hydrodealkylation and dehydrogenation.

Hydrorefining hydrocarbon feeds such as sulphur-containing petroleum cuts is assuming greater importance in refining as the need to reduce the quantity of sulphur present in petroleum products increases, along with the need to convert heavy fractions into lighter fractions that can be upgraded to fuels. This fact derives firstly from the economic importance of upgrading imported crudes that have ever increasing heavy fractions as far as possible, which are low in hydrogen and rich in heteroatoms including nitrogen and sulphur, and secondly on the specifications imposed on commercial fuels in many countries.

Current catalytic hydrorefining processes use catalysts that can promote the principal reactions used to process those cuts, in particular the hydrogenation of aromatic nuclei (HAR), hydrodesulphurization (HDS), hydrodenitrogenation (HDN) and other hydroeliminations. Hydrorefining is used to treat feeds such as gasoline, gas oil, vacuum gas oil or atmospheric or vacuum residues, deasphalted or otherwise. It is also indicated in the pre-treatment of feeds for cracking and catalytic hydroconversion processes. At least one hydrorefining step is normally integrated into each of the known schemes for upgrading petroleum cuts.

The problem for the skilled person lies in obtaining high catalytic performances for the catalytic hydrorefining processes, in particular as regards activity, more particularly for hydrodesulphurization processes, while guaranteeing satisfactory industrial implementation.

The Applicant has observed that oxide precursors containing heteropolyanions associating at least one group VI element, generally molybdenum and/or tungsten, and at least one group VIII element in the same molecule, result in catalysts with a catalytic activity that is substantially higher than that of catalysts prepared from standard precursors not containing said heteropolyanions. The existence of the heteropolyanion can be demonstrated using different physico-chemical techniques. The following can be cited: NMR (nuclear magnetic resonance), infrared spectroscopy, UV-visible spectroscopy and X-ray absorption spectroscopy. The preferred method is X ray absorption spectroscopy. It would appear that the particular association existing between the group VI element or elements and the group VIII element or elements in the form of heteropolyanions in the oxide precursor used to prepare the catalysts is at the origin of the increase in catalytic activity.

The importance of heteropolyanions has already been mentioned in the prior art. As an example, United States document U.S. Pat. No. 2,547,380 mentions the beneficial use of heteropolyacid salts of metals from group VIII such as the cobalt or nickel salts of phosphomolybdic acid or silicomolybdic acid. In that patent, the heteropolyacid always contains phosphorus or silicon, the latter element being the central atom of the structure. Said compounds have the disadvantage of resulting in limited (group VIII element/group VI element) atomic ratios. As an example, cobalt phosphomolybdate with formula $Co_{1.5}PMo_{12}O_{40}$ has a Co/Mo ratio of 0.125.

French patent application FR-A-2 749 778 describes the importance of heteropolyanions with general formula $M_xAB_{12}O_{40}$ in which M is cobalt or nickel, A is phosphorus, silicon or boron and B is molybdenum or tungsten, x taking the value 2 or more if A is phosphorus, 2.5 or more if A is silicon and 3 or more if A is boron. Said structures have the advantage over the structures disclosed in U.S. Pat. No. 2,547,380 of achieving (group VIII element/group VI element) atomic ratios that are higher and thus produce better catalysts. Said increase in the ratio is obtained by dint of the presence of at least a portion of the molybdenum or tungsten with a valency that is lower than its normal value of six as is obtained, for example, in the composition of phosphomolybdic acid, phosphotungstic acid, silicomolybdic acid or silicotungstic acid.

French patent application FR-A-2 764 211 describes the synthesis and use of heteropolyanions with formula $M_xAB_{11}O_{40}M'C_{(Z-2x)}$ in which M is cobalt or nickel, A is phosphorus, silicon or boron and B is molybdenum or tungsten, M' is cobalt, iron, nickel, copper or zinc, and C is an $H^+$ ion or an alkylammonium cation, x takes the value 0 to 4.5 and z takes a value between 7 and 9. This latter formula has the advantage of producing atomic ratios between the group VIII element and the group VI element that can reach 0.5. However, even though the (group VIII element/group VI element) ratio is high in that case, the group VIII element is primarily present in the form of counter-ions to the heteropolyanion $AB_{12}O_{40}^{2x-}$. A maximum of one group VIII (M') atom per 11 group VI (B) atom) is found inside the heteropolyanion structure, the remaining (M) being in the form of a counter-ion. Thus, the number of neighbouring group VI atoms found in the immediate proximity of the group VIII element is limited, limiting the beneficial interaction between the two elements.

SUMMARY AND ADVANTAGE OF THE INVENTION

The catalyst of the invention is a catalyst comprising at least one group VIII element and at least molybdenum and/or tungsten, said elements being present at least in part in the catalyst in the dry state in the form of at least one heteropolyanion in the oxide precursor used to prepare said catalyst. The structure of the heteropolyanion associating at least one group VIII element and at least molybdenum and/or tungsten has one of formulae I, I', I'', I''', I'''' described below.

$$M_xAB_6O_{24}H_6C_{(3-2x)}, tH_2O \qquad \text{formula (I)}$$

in which M is cobalt and/or nickel and/or iron and/or copper and/or zinc, A is an element from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 3/2, preferably in the range 0.05 to 3/2 and highly preferably in the range 0.1 to 3/2.

$$M_xAB_6O_{24}H_6C_{(4-2x)}, tH_2O \qquad \text{formula (I')}$$

in which M is cobalt and/or nickel and/or iron and/or copper and/or zinc, A is an element from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 2, preferably in the range 0.05 to 2 and highly preferably in the range 0.1 to 2.

$$M_xA_2B_{10}O_{38}H_4C_{(6-2x)}, tH_2O \qquad \text{formula (I'')}$$

in which M is cobalt and/or nickel and/or iron and/or copper and/or zinc, A is one or two elements from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 3, preferably in the range 0.05 to 3 and highly preferably in the range 0.1 to 3.

$$M_xA_2B_{10}O_{38}H_4C_{(8-2x)}, tH_2O \qquad \text{formula (I''')}$$

in which M is cobalt and/or nickel and/or iron and/or copper and/or zinc, A is one or two elements from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 4, preferably in the range 0.05 to 4 and highly preferably in the range 0.1 to 4.

$$M_xA_2B_{10}O_{38}H_4C_{(7-2x)}, tH_2O \qquad \text{formula (I'''')}$$

in which M is cobalt and/or nickel and/or iron and/or copper and/or zinc, A is one or two elements from group VIII of the periodic table, B is molybdenum and/or tungsten and C is an $H^+$ ion and/or a $(NR_1R_2R_3R_4)^+$ type ammonium ion, in which $R_1$, $R_2$, $R_3$ and $R_4$, which may be identical or different, correspond either to a hydrogen atom or to an alkyl group and/or caesium and/or potassium and/or sodium, t is a number between 0 and 15 and x takes a value in the range 0 to 7/2, preferably in the range 0.05 to 7/2 and highly preferably in the range 0.1 to 7/2.

In each of these heteropolyanion structures, which associate both at least one group VIII element with at least molybdenum and/or tungsten, the number of bonds connecting the group VIII elements to molybdenum and/or tungsten and with a length of 3.6 angstroms or less is strictly more than 2, i.e., more than 2 molybdenum and/or tungsten atoms surround the atoms of the group VIII element or elements at a distance of 3.6 angstroms or less. This type of feature is readily demonstrated by the X ray absorption spectroscopic characterization technique. In addition to this essential characteristic of having a strong interaction between the group VIII element or elements and the molybdenum and/or tungsten, indicated by a large number (>2) of group VIII-short Mo/W bonds (d≦3.6 angstroms), said structures with formula I, I', I'', I''' and I'''' have the advantage of producing an overall high group VIII element(s)/Mo and/or W) ratio.

Such catalysts in which, in the dry state, the group VIII element or elements and molybdenum and/or tungsten are at least partially present in the form of heteropolyanions, produce a catalytic activity in the hydrorefining and hydroconversion processes, in particular in aromatic hydrocarbon hydrogenation processes, hydrodesulphurization and hydrodenitrogenation, that is higher than that of catalytic formulae that are known in the prior art. Without wishing to be bound by any particular theory, it appears that this particularly high activity of the catalysts of the invention is due to the strong interaction existing in the oxide precursor between the group VIII element or elements and the molybdenum and/or tungsten in the form of heteropolyanions. This strong interaction between the oxide precursor would more readily produce a larger quantity of a mixed sulphide phase such as the mixed "CoMoS" phase in the case of the CoMo pair to which the highest catalytic activity is attributed for said reactions.

The invention concerns a catalyst comprising at least one group VIII element and at least molybdenum and/or tungsten, said group VI and group VIII elements being present at least in part in the catalyst in the dry state in the form of at least one heteropolyanion in the oxide precursor used to prepare the catalyst.

More precisely, the catalyst of the invention comprises at least one group VIII element and at least molybdenum and/or tungsten, said elements being present at least in part in the catalyst in the dry state in the form of at least one heteropolyanion with a structural formula selected from the group constituted by formulae I, I', I'', I''', I'''' as described below:

$$M_xAB_6O_{24}H_6C_{(3-2x)}, tH_2O, \qquad \text{formula (I)}$$

in which M is cobalt and/or nickel and/or iron and/or copper and/or zinc, A is an element from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 3/2, preferably in the range 0.05 to 3/2 and highly preferably in the range 0.1 to 3/2.

$$M_xAB_6O_{24}H_6C_{(4-2x)}, tH_2O \qquad \text{formula (I')}$$

in which M is cobalt and/or nickel and/or iron and/or copper and/or zinc, A is an element from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 2, preferably in the range 0.05 to 2 and highly preferably in the range 0.1 to 2.

$$M_xA_2B_{10}O_{38}H_4C_{(6-2x)}, tH_2O \qquad \text{formula (I'')}$$

in which M is cobalt and/or nickel and/or iron and/or copper and/or zinc, A is one or two elements from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 3, preferably in the range 0.05 to 3 and highly preferably in the range 0.1 to 3.

  formula (I''')

in which M is cobalt and/or nickel and/or iron and/or copper and/or zinc, A is one or two elements from group VIII of the periodic table, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15 and x takes a value in the range 0 to 4, preferably in the range 0.05 to 4 and highly preferably in the range 0.1 to 4.

  formula (I'''')

in which M is cobalt and/or nickel and/or iron and/or copper and/or zinc, A is one or two elements from group VIII of the periodic table, B is molybdenum and/or tungsten and C is an $H^+$ ion and/or a $(NR_1R_2R_3R_4)^+$ type ammonium ion, in which $R_1$, $R_2$, $R_3$ and $R_4$, which may be identical or different, correspond either to a hydrogen atom or to an alkyl group and/or caesium and/or potassium and/or sodium, t is a number between 0 and 15 and x takes a value in the range 0 to 7/2, preferably in the range 0.05 to 7/2 and highly preferably in the range 0.1 to 7/2.

In each of these heteropolyanion structures, which associates at least one group VIII element with at least molybdenum and/or tungsten, the number of bonds connecting the group VIII elements to molybdenum and/or tungsten and with a length of 3.6 angstroms or less is strictly more than 2, i.e., more than 2 molybdenum and/or tungsten atoms surround the atoms of the group VIII element or elements at a distance of 3.6 angstroms or less. This type of feature is readily demonstrated by the X ray absorption spectroscopic characterization technique. The high number of neighbouring molybdenum and/or tungsten atoms in the immediate proximity of the group VIII element or elements result in a strong interaction in the catalyst of the invention between the molybdenum and/or the tungsten and the group VIII element or elements.

Preferably, more than 2 bonds connecting the group VIII element or elements to the molybdenum and/or tungsten have a length of 3.5 angstroms or less in the catalyst in the dry state.

The group VIII element A present in the heteropolyanion structure is advantageously cobalt, nickel or iron.

The catalyst of the invention can be in the bulk form. In this form, it generally contains, in the dry state, as a % by weight with respect to the total catalyst weight, 0.01% to 100%, preferably 0.05% to 100% and more preferably 0.1% to 100% by weight of at least one heteropolyanion including at least one element from group VIII of the periodic table, preferably cobalt, nickel or iron, and at least molybdenum and/or tungsten and with a structural formula selected from the group constituted by formulae I, I', I'', I''' and I'''' described above.

The catalyst of the invention can also be in the supported form, i.e., it comprises a porous mineral matrix, in particular acting as a support, which may also comprise a zeolitic molecular sieve.

The supported catalyst of the present invention generally comprises, in the dry state as a % by weight with respect to the total catalyst weight:

1% to 99.9%, preferably 5% to 99.5% and more preferably 10% to 99% of at least one porous mineral matrix;

0.1% to 99%, preferably 0.5% to 95% and more preferably 1% to 90% of at least one heteropolyanion including at least one metal from group VIII of the periodic table, preferably cobalt, nickel or iron, and at least molybdenum and/or tungsten and having a structural formula selected from the group constituted by formulae I, I', I'', I''' and I'''' above;

0 to 80%, preferably 3% to 70% and more preferably 5% to 60% of at least one zeolitic molecular sieve, for example a Y zeolite with a faujasite structure, generally in its hydrogen form.

The essential characteristics of each of the structures with formulae I, I', I'', I''' and I'''' for the heteropolyanion in the catalyst of the invention, namely the number of bonds connecting the group VIII element or elements to molybdenum and/or tungsten (>2) and the length of each of said bonds (≦3.6 angstroms), can be determined using X ray absorption spectroscopy. X ray absorption spectroscopy can produce structural information regarding the local environment of a given atom regardless of the physical state of the material (crystalline or amorphous solid, liquid, polyatomic gas). The X-ray photons used during this type of technique are generally produced using a synchrotron. The synchrotron radiation constitutes a high intensity source of X photons with synchronized energies. It is produced by relativistic charged particles (positrons or electrons) that are subjected to centripetal acceleration in a magnetic field. Said relativistic charged particles emit radiation (X ray photons) along the tangent to their circular trajectory.

On the macroscopic level, when X rays traverse a material, the intensity I of the transmitted beam after traversing a homogeneous sample with thickness x and with an absorption coefficient μ is lower than the intensity $I_0$ of the incident beam. The ratio of intensity $I/I_0$ obeys Beer-Lambert's law: $I/I_0 = e^{-\mu x}$.

On the microscopic level, a photon with energy hν excites an electron from the inner orbitals of the absorber atom (1s at the K edge, 2p at the L edge) which is ejected in the form of a photoelectron if the energy hν of the incident photon is higher than the energy of the excited electron of the absorber atom. If the photon energy is lower than the ionization energy of the absorber atom, then bound excited electronic states corresponding to XANES (X ray absorption near edge structure) are the states that are explored. The ejected photoelectron propagates in the medium with a kinetic energy and a wave associated with a wave vector k. In the case of a non isolated atom, there are interferences between the leaving wave and the wave retrodiffused by neighbouring atoms. Interference with the leaving wave periodically modulates the absorption coefficient. Oscillations are obtained: they correspond to the X ray spectroscopy absorption signal. Processing said oscillations can produce a Fourier transform which corresponds to the radial distribution of the atoms around the absorbing atom.

X ray absorption spectroscopy enables the composition of the sample (molybdenum and/or tungsten and group VIII elements) for said non crystalline materials to be determined. The characterizations are made on the molybdenum and/or tungsten K edges in transmission or fluorescence, and the K edge of the group VIII element in transmission or fluorescence.

The signal produced by X ray absorption spectroscopy is formed by oscillations that can characterize the local environment of an absorbing atom (interatomic distances, number and nature of neighbours). In the present case, the parameters to be identified are the number and the nature of the neighbouring atoms and are obtained by modeling the signal given by the X ray absorption spectroscopy.

Interpreting the X ray absorption spectra enables the radial distribution function around the atoms of the absorber element to be visualized by extracting the Fourier transform of the signal given by X ray absorption spectroscopy. This radial distribution has characteristic peaks. The abscissa for the peaks is related to the position of the atoms around the absorbing atom. The ordinate is related to the number and nature of the atoms located at a given distance on the abscissa of the peaks under consideration. The description below pertains to a system containing molybdenum as the group VI element and cobalt as the group VIII element, but is applicable to any solid of the invention.

For molybdenum, the first peak in the Fourier transform corresponds to the oxygen environment of the absorber molybdenum atom; the second peak corresponds to the cobalt or molybdenum and cobalt environment around the absorber molybdenum. For cobalt, the first peak of the Fourier transform corresponds to the oxygen environment of the absorber cobalt atom; the second peak corresponds to the molybdenum or molybdenum and cobalt environment around the absorber cobalt.

The radial distribution for a catalyst of the invention, in which in the dry state at least one group VIII element and at least molybdenum and/or tungsten are in the form of at least one heteropolyanion having one of the structures described above, is qualitatively and quantitatively different from that of a catalyst with the same overall composition but containing no heteropolyanions with said structure. The oxygen environment around the absorber atom (molybdenum or cobalt) remaining the same, the first peak of the Fourier transform is not affected. Modifications to the radial distribution appear in the second peak of the Fourier transform.

The solids were analyzed in the form of pelletized or packed powders, in transmission or fluorescence at the Co K edge. Preparation consisted of finely milling the sample to be analyzed in a mortar (possibly mixed with cellulose), the quantity of which was fixed in order to result in an absorption jump of close to one unit. In the present case the total pellet mass was 60 mg. The detection line was provided with a channel cut monochromator, i.e., double Bragg reflection monochromator, with solid crystals, provided with a Si[111] crystal. The Co 1s K absorption edge is located at 7709 eV; that for Mo is at 20000 eV. The absorption spectra were recorded at 2 eV intervals for the Co K edge and 3 eV intervals for the Mo K edge and the count time was 2 s per interval. Five spectra are accumulated for each sample, but the number could have been higher for a smaller amount of cobalt. The software used for processing and treatment of the data obtained by X ray absorption spectroscopy was EXAFS98ppc by A Michalowicz, and Roundmidnight. The X ray absorption spectrum was first transformed into k space ($k^3$, Kaiser window 2.6 to 14.9 $Å^{-1}$), to R space to obtain the radial distribution (RDF). The X ray absorption spectrum for one or more coordination spheres was isolated by reverse Fourier transformation of the RDF over the appropriate region and treated using the simple diffusion X ray absorption spectroscopy equation with amplitude and phase functions calculated using FEFF software or using reference experimental spectra.

A bulk salt $CoMo_6O_{24}H_6(Co)_{3/2}$ and a catalyst based on $Co_2Mo_{10}O_{38}H_4(Co)_3/Al_2O_3$, in accordance with the invention, were analyzed in the dry state, along with a catalyst based on ammonium heptamolybdate and cobalt nitrate, not in accordance with the invention. The treatments provided a mean value of the number and nature of the atoms neighbouring the cobalt, which in this case was the absorber atom. Table I shows the results of the refinements to these X ray absorption spectra. Only molybdenum neighbouring atoms are recorded, as the oxygen environment of the cobalt varies little for the different precursors envisaged.

TABLE I

Examples of the results of refinements to the X ray absorption spectra at the Co K edge

| | d(Co—Mo) (Å) | number of Mo neighbouring atoms |
|---|---|---|
| bulk $CoMo_6O_{24}H_6(Co)_{3/2}$ salt | 3.34 | 2.52 |
|  | 3.59 | 0.60 |
| $Co_2Mo_{10}O_{38}H_4(Co)_3/Al_2O_3$ catalyst | 2.97 | 0.52 |
|  | 3.29 | 2.46 |
| $CoMo/Al_2O_3$ catalyst | d > 3.6 Å | treatment not carried out |

Thus, in the two samples in accordance with the invention, there are more than 2 molybdenum neighbouring atoms around the cobalt, and are located at a distance of less than 3.6 Å, both in the precursor salt and in the catalyst of the invention. The catalyst that is not in accordance with the invention (last row of the table) contains no molybdenum at a distance of less than 3.6 Å, as the first molybdenum atoms neighbouring the cobalt were located at more than 3.6 Å.

When the catalyst of the invention is a supported catalyst, the support is formed from at least one porous mineral matrix, normally amorphous or of low crystallinity. That matrix is normally selected from the group constituted by alumina, silica, silica-alumina, magnesia, clay, titanium oxide, zirconium oxide, lanthanum oxide, cerium oxide, aluminium phosphates, boron phosphates, or a mixture of at least two of the oxides cited above and alumina-boron oxide combinations, alumina-titanium, alumina-zirconium and titanium-zirconium mixtures. It is also possible to use aluminates, for example magnesium, calcium, barium, manganese, iron, cobalt, nickel, copper and zinc aluminates, mixed aluminates and, for example, those containing at least two of the metals cited above. It is possible to use titanates, for example zinc, nickel or cobalt titanates. Preferably, matrices containing alumina in all of its forms that are known to the skilled person, for example gamma alumina, are used. It is also advantageous to use mixtures of alumina and silicon and mixtures of alumina and boron oxide.

In addition to at least one of the compounds cited above, the matrix can also include at least one compound selected from the group constituted by the family of molecular sieves of the crystalline aluminosilicate type, synthetic and natural zeolites such as Y zeolite, fluorinated Y zeolite, Y zeolite containing rare earths, X zeolite, L zeolite, beta zeolite, small pore mordenite, large pore mordenite, omega zeolites, NU-10, ZSM-22, NU-86, NU-87, NU-88, and zeolite ZSM-5. Preferred zeolites that are usually used are zeolites with a framework silicon/aluminium (Si/Al) atomic ratio of more than about 3:1. Advantageously, zeolites with a faujasite structure and in particular stabilized and ultrastabilized (USY) are used, either at least partially exchanged with metal cations, for example alkaline—earth metal cations and/or cations of rare earth metals with atomic numbers 57 to 71 inclusive, or in the hydrogen form ("Zeolite Molecular Sieves, Structure, Chemistry and Uses", D W BRECK, J Wiley & Sons 1973).

The acidic supports can also be selected from the group constituted by non zeolitic crystalline molecular sieves such as mesoporous silicas, silicalite, silicoaluminophosphates, aluminophosphates, ferrosilicates, titanium silicoaluminates, borosilicates, chromosilicates and transition metal (including cobalt) aluminophosphates.

The catalysts of the invention can be prepared using any method that is known to the skilled person provided that the essential characteristics regarding the length and number of bonds between the group VIII elements and the molybdenum and/or tungsten in the catalyst in the dry state are obtained.

Preferably, the supported catalysts of the present invention are prepared in two steps. The first step consists of synthesizing the salt corresponding to the heteropolyanion in one of formulae I, I', I, I''' or I'''' and the second step by introducing it to the support. The salt of the heteropolyanion is synthesized in two sequences. The first sequence consists of synthesizing:

either a salt with formula $AB_6O_{24}H_6C_3$, $tH_2O$, formula (II)

in which A is an element from group VIII, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15;

or a salt with formula $AB_6O_{24}H_6C_4$, $tH_2O$ formula (II')

in which A is an element from group VIII, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15;

or a salt with formula $A_2B_{10}O_{38}H_4C_6$, $tH_2O$ formula (II'')

in which A is one or two elements from group VIII, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15;

or a salt with formula $A_2B_{10}O_{38}H_4C_8$, $tH_2O$ formula (II''')

in which A is one or two elements from group VIII, nickel and/or cobalt, B is molybdenum and/or tungsten and C is an $H^+$ ion and/or an ammonium ion of the type $(NR_1R_2R_3R_4)$ in which $R_1$, $R_2$, $R_3$ and $R_4$, which may be identical or different, correspond either to a hydrogen atom or to an alkyl group and/or caesium and/or potassium and/or sodium, t is a number from 0 to 15;

or a salt with formula $A_2B_{10}O_{38}H_4C_7$, $tH_2O$ formula (II'''')

in which A is one or two elements from group VIII, B is molybdenum and/or tungsten and C is an $H^+$ ion and/or a $(NR_1R_2R_3R_4)^+$ type ammonium ion, in which $R_1$, $R_2$, $R_3$ and $R_4$, which may be identical or different, correspond either to a hydrogen atom or to an alkyl group and/or caesium and/or potassium and/or sodium, t is a number between 0 and 15.

Said salts with formulae II, II', II'', II''' and II'''' are synthesized by mixing an aqueous solution of the nitrate or sulphate of A with a solution of the molybdate or tungstate of C supplemented with hydrogen peroxide. This mixture is heated to between 80° C. and 100° C., preferably between 90° C. and 95° C., for several hours, and after cooling, the desired salt, which precipitates out, is separated by filtering. For salts with formulae II'', II''; and II'''', it is necessary to add activated charcoal to the reaction mixture to orientate the reaction, to favour the dimeric entity.

When said first sequence of the synthesis has been carried out, the second sequence consists of substituting all or a portion of cation C with M atoms, i.e., at least one cobalt, nickel, iron, copper and/or zinc compound, to obtain a compound with formula (I), (I'), (I''), (I''') or (I'''').

In a first preferred implementation of this preparation sequence, direct ion exchange is carried out by dissolving the salts of the compounds with formulae II, II', II'', II''' or II'''' in the reaction medium to obtain heteropolyanions with formula I, I', I'', I''' or I'''' at the end of the reaction. If in the compounds with formula II, II', II'', II''' or II'''' obtained during the first step of the synthesis, all or part of C is an ammonium cation ($NH_4^+$), it is possible to substitute all or a portion of the ammonium cations with a cation of a metal M selected from the group constituted by cobalt, nickel, iron, copper and zinc by adding to the reaction medium a compound the anion of which forms a completely insoluble compound with the ammonium cation to obtain heteropolyanions with formula I, I', I'', I''' or I'''' at the end of the reaction. Salts such as cobalt and/or nickel salts of phosphomolybdic acid are selected as the group VIII metal heteropolyacid salts.

In a second preferred implementation of this sequence in the preparation of the invention, a succession of ion exchange steps is carried out, consisting of dissolving or precipitating from the reaction medium salts of compounds with formula II, II', II'', II''' or II'''' to obtain heteropolyanions with formula I, I', I'', I''' or I'''' at the end of the reaction. If in the compounds with formula II, II', II'', II''' or II'''' obtained during the first step of the synthesis, all or part of C is an ammonium ($NH_4^+$) and/or sodium cation, it is advantageous to substitute all or a portion of said ammonium and/or sodium cations with alkylammonium and/or caesium and/or potassium cations to improve ion exchange and obtain a heteropolyanion with formula I, I', I'', I''' or I''''. It is then possible to substitute all or a portion of the alkylammonium and/or caesium and/or potassium cations with a cation of a metal M selected from the group constituted by cobalt, nickel, iron, copper and zinc by adding the precipitate recovered from the compound with formula II, II', II'', II''' or II'''' in which C is a $H^+$ and/or ammonium and/or alkylammonium and/or caesium and /or potassium and/or sodium cation to a saline solution of said metal M, or vice versa. In a preferred mode, the soluble salt of metal M from this group is selected so that the corresponding anion forms an insoluble complex with the alkylammonium and/or caesium and/or potassium cations, which precipitates out while the heteropolyanion with formula I, I', I'', I''' or I'''' remains in solution.

If compound II, II', II'', II''' or II'''' obtained comprises exclusively alkylammonium and/or $H^+$ and/or caesium and/or potassium cations, substitution with a metal selected from the group constituted by cobalt, nickel, iron, copper or zinc can be carried out directly Within the context of the present invention, cations C are caesium, potassium, sodium, $H^+$ and/or ammonium ($NH_4^+$) cations and/or alkylammonium cations selected from the group constituted by tetralkylammonium cations $[(C_nH_{2n+1})_4N]^+$, trialkylammonium cations $[(C_nH_{2n+1})_3NH]^+$, with n being from 1 to 4, hydrazinium cations, alkylhydrazinium cations, and guadinium ions:

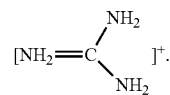

To exchange the ammonium and/or sodium cations in compounds II, II', II'', II''' or II'''' into alkylammonium and/or caesium and/or potassium cations, the anions associated with the alkylammonium and/or caesium and/or potassium ions are preferably selected from halides such as chlorides, bromides and/or iodides, but also from any other anion constituting a soluble alkylammonium and/or caesium and/or potassium salt. On exchange, an alkylammonium and/or caesium and/or potassium salt of the II, II', II'', II''' or II'''' that is insoluble or only slightly soluble in aqueous media is obtained.

The metal salts used in the second exchange step can be a perchlorate, perbromate or periodate, or any other soluble salt the anion of which forms an insoluble compound with the exchanged alkylammonium and/or caesium and/or potassium ions. In this second ion exchange step, the perchlorate of metal M selected from the group constituted by cobalt, nickel, iron, copper and zinc is preferred; the heteropolyanions with formula I, I', I'', I''' or I'''' thus formed remain soluble in aqueous media while the alkylammonium and/or caesium and/or potassium perchlorate precipitates out.

In the first ion exchange consisting of replacing all or a portion of the ammonium and/or sodium ions with alkylammonium and/or caesium and/or potassium ions, it is possible to use an alkylammonium and/or caesium and/or potassium salt in a quantity that is higher than that stoichiometrically required for the compound with formula II, II', II'', II''' or II''''.

It is also possible to use more of the metal M salt than the quantity stoichiometrically required for the compound with formula I, I', I'', I''' or I''''. In this case, the excess salt is introduced at the beginning into the impregnating solution, or is used for impregnation which follows impregnation with the heteropolyanion with formula I, I', I'', I''' or I'''', either directly, or after drying the impregnated support, or finally after calcining the impregnated support.

To exchange the ammonium and/or sodium cations of the compound with formula II, II', II'', II''' or II'''', it is possible to circulate said compound through an ion exchange resin donating either metal cations from the group (Co, Ni, Fe, Cu, Zn) or alkylammonium and/or caesium and/or potassium cations. In this case, it is vital that the heteropolyanion with formula I, I', I'', I''' or I'''' is at least partially soluble in aqueous media.

A particular case of this synthesis that is not described above consists of resin ion exchange of the ammonium and/or sodium ions using lithium and in a second step, exchanging the lithium for a metal M by adding a carbonate of M to the solution containing the lithium salt of the formula II, II', II'', II''' or II'''' to cause lithium carbonate to precipitate out.

At this stage of the preparation, the catalyst is in the bulk form.

The prepared heteropolyanions in the catalyst of the invention are compounds that are soluble in aqueous media. The heteropolyanion can thus be introduced into to the support to obtain a supported catalyst using any technique that is known to the skilled person before, during or after forming the support. However, it is preferable to introduce the heteropolyanion to a support that has been formed using the well known dry impregnation technique in which a) the support, for example a commercially available alumina, is impregnated with an aqueous solution containing the desired quantity of heteropolyanions and optionally molybdenum and/or tungsten introduced in another form and optionally a further group VIII element introduced in another form, b) the moist solid is left in a moist atmosphere at a temperature in the range 10° C. to 80° C.; c) the solid obtained in step b) is dried at a temperature in the range 10° C. to 150° C.; and d) the solid obtained in step c) is calcined at a temperature in the range 80° C. to 800° C. in an oxidizing atmosphere (for example air or oxygen), a neutral atmosphere (for example nitrogen or argon) or a reducing atmosphere (for example hydrogen).

Advantageously, the heteropolyanions with formula I, I', I'', I''' or I'''' contained in the impregnation solutions are selected from the group constituted by $Co_2Mo_{10}O_{38}H_4Co_3$, $CoMo_6O_{24}H_6Ni_{3/2}$, $CoMo_6O_{24}H_6Co_2$, $Co_2Mo_{10}O_{38}H_4Ni_3$, $Ni_2Mo_{10}O_{38}H_4Co_4$, $NiMo_6O_{24}H_6Co_2$, $CoMo_6O_{24}H_6Ni_2$, $CoMo_6O_{24}H_6Co_{3/2}$, $NiMo_6O_{24}H_6Ni_2$.

The present invention also concerns catalysts in the dry state containing at least one heteropolyanion having one of structures I, I', I'', I''' or I'''' and catalysts in the calcined state obtained by calcining a dried catalyst. A calcined catalyst in accordance with the present invention contains at least one group VIII element, preferably cobalt, nickel or iron, and at least molybdenum and/or tungsten, in which said group VIII and VI elements interact strongly and is prepared from an oxide precursor in the form of heteropolyanions associating said group VIII and VI elements and having a structure with formula I, I', I'', I''' or I'''', in which the number of bonds between the group VIII element or elements and the molybdenum and/or tungsten and with a length of 3.6 angstroms or less, preferably 3.5 angstroms or less, is strictly more than 2. The catalysts of the invention, in the dried or calcined state, preferably undergo a sulphurization treatment to obtain sulphide type catalysts; the sulphurization treatment can at least partially transform metallic species into sulphides prior to bringing them into contact with the feed to be treated. This sulphurization activation treatment is well known to the skilled person and can be carried out using any method that has been described in the literature.

The source of the sulphur can be elemental sulphur, carbon disulphide, hydrogen sulphide, sulphur-containing hydrocarbons such as dimethylsulphide, dimethyldisulphide, mercaptans, thiophene compounds, thiols, polysulphides such as ditertiononylpolysulphide or TPS-37 from ATOFINA, sulphur-rich petroleum cuts such as gasoline, kerosene, gas oil, used alone or as a mixture with one of the sulphur-containing compounds cited above. The preferred sulphur source is hydrogen sulphide or sulphur-containing hydrocarbons such as dimethyldisulphide.

One known conventional sulphurization method consists of heating in the presence of hydrogen sulphide (pure or, for example, in a stream of hydrogen/hydrogen sulphide) to a temperature in the range 150° C. to 800° C., preferably in the range 250° C. to 600° C., generally in a traversed bed reaction zone.

The catalysts of the present invention are used for hydrorefining and/or hydroconversion of hydrocarbon-containing feeds such as petroleum cuts, cuts from coal or hydrocarbons produced from natural gas and are more particularly used for hydrogenation, hydrodenitrogenation, hydrodeoxygenation, hydrodearomatization, hydrodesulphurization, hydrodemetallization, hydroisomerization, hydrodealkylation and dehydrogenation. The catalysts of the present invention are also advantageously used for hydrocracking hydrocarbon-containing feeds such as feeds containing aromatic and/or olefinic compounds and/or naphthenic and/or paraffinic compounds, said feeds possibly containing metals and/or nitrogen, and/or oxygen and/or sulphur. In these uses, the catalysts of the present invention have an improved activity over the prior art.

The feeds use in the various processes using the catalyst of the invention are generally selected from the group constituted by gasoline, gas oil, vacuum gas oil, deasphalted or non deasphalted residues, paraffin oils, waxes and paraffins. They contain at least one heteroatom such as sulphur, oxygen or nitrogen and possibly contain metals such as nickel or vanadium. The hydrorefining or hydroconversion conditions such as temperature, pressure, the litre of hydrogen/litres of hydrocarbon volume ratio, or hourly space velocity, can vary widely as a function of the nature of the feed, the quality of the desired products and the facilities available to the refiner. The operating conditions employed in the reactors for the various processes using the catalyst of the invention are: a temperature of over 200° C., preferably in the range 200° C. to 450° C., at a pressure in the range 0.5 to 30 MPa, preferably less than 20 MPa, the space velocity being in the range 0.1 to 10 $h^{-1}$, preferably in the range 0.1 to 8 $h^{-1}$, and highly preferably in the range 0.2 to 6 $h^{-1}$, and the quantity of hydrogen introduced is such that the litres of hydrogen/litres of hydrocarbon volume ratio is in the range 10 to 5000 l/l, preferably in the range 100 to 2000 l/l.

EXAMPLES

The following examples illustrate the invention without limiting its scope.

Example 1

Supported CoMo Catalyst with a Co/Mo Ratio of About 0.41 Atoms/Atom (Comparative)

Molybdenum and cobalt were dry co-impregnated in an aqueous medium onto a commercially available γ-$Al_2O_3$ support (Axens, 250 m²/g). The precursor salt for the molybdenum was ammonium heptamolybdate $(NH_4)_6Mo_7O_{24}$, $4H_2O$; the cobalt precursor salt was cobalt nitrate $Co(NO_3)_2$, $6H_2O$. The quantity of cobalt was adjusted to satisfy a Co/Mo mole ratio of 0.41 atoms/atom. After maturing for 2 hours, the extrudates were dried overnight at 100° C., then calcined in oxygen at 500° C. for 4 hours. For the non-sulphided Co—$MoO_3$/$Al_2O_3$ catalyst, the molybdenum oxide content was 8.3% and the cobalt oxide content was 1.85%, corresponding to a real Co/Mo ratio of 0.43 atoms/atom. This catalyst A was representative of an industrial catalyst and was not in accordance with the invention.

Example 2

Supported CoMo Catalyst Prepared from $(CoMo_6O_{24}H_6)Co_{3/2}$ and with a Co/Mo Ratio of 0.41 Atoms/Atom (in Accordance with the Invention)

The heteropolyanion was initially prepared in the form of the ammonium salt using the following method:

166.72 g of $(NH_4)_6Mo_7O_{24}$, $4H_2O$ (0.135 mole) was dissolved in 1403 cm³ of $H_2O$ in a 2 litre flask (colourless solution). The solution was heated to 95° C., then added to a solution obtained at ambient temperature with 23.571 g of $Co(NO_3)_2$, $6H_2O$ (0.081 mole) and 10.80 g of 30% $H_2O_2$, made up to 160 cm3 with water (pink colour). The solution obtained, black-greenish in colour, was evaporated with stirring until a volume of about 800 ml of solution remained. After leaving for 12 hours at ambient temperature, an emerald green precipitate was observed: $CoMo_6O_{24}H_6(NH_4)_3$, which was then filtered and dried through a frit to obtain the bulk $CoMo_6O_{24}H_6(NH_4)_3$ salt.

17.3 g of phosphomolybdic acid $H_3PMo_{12}O_{40}$, $13H_2O$ (0.008 mole) was dissolved in 75 cm³ of $H_2O$ at ambient temperature (translucent yellow colour). 3.924 g of Ba$(OH)_2$, $8H_2O$ (0.012 mole) was added to this solution which was then stirred for about ½ hour (no colour change) before adding 3.500 g of $CoSO_4$, $7H_2O$ (0.012 mole). The solution obtained was stirred for 2 hours (it turned opaque and orangeish) before being filtered through a frit to separate out the precipitate of $(NH_4)_3PMo_{12}O_{40}$ (yellowish white) from the solution of $Co_{3/2}PMo_{12}O_{40}$ (orange, translucent). The $Co_{3/2}PMo_{12}O_{40}$ solution was placed in the refrigerator to crystallize and the crystals were recovered as they formed and allowed to dry in air to produce the hydrate $Co_{3/2}PMo_{12}O_{40}$, $13H_2O$.

Finally, the last step consisted of exchanging ammonium ions for cobalt ions using the following method:

5.35 g of the ammonium salt $CoMo_6O_{24}H_6(NH_4)_3$ was dissolved in 100 ml of water at 50° C. to obtain an approximately 0.05 M solution. 9.65 g of $Co_{3/2}PMo_{12}O_{40}$ was then added and the solution was stirred at 50° C. for 2 hours (milky yellow colour). After cooling to ambient temperature and filtering through a frit to separate the precipitate of $(NH_4)_3PMo_{12}O_{40}$ (bright yellow), the dark green solution of the cobalt salt $Co_{3/2}CoMo_6O_{24}H_6$ was left in the refrigerator to crystallize.

A sufficient quantity of the salt obtained was then dissolved to form a 1.08 mole/l solution of Mo. This solution was dry impregnated into a commercial γ $Al_2O_3$ alumina support. After maturing for 2 hours, the extrudates were dried overnight at 100° C., then calcined in oxygen at 500° C. for 4 hours. For the non-sulphided CoMo/$Al_2O_3$ catalyst, the molybdenum oxide content was 9.9% and the cobalt oxide content was 2.15%, corresponding to a real Co/Mo ratio of 0.41 a toms/atom. This catalyst B was representative of a CoMo catalyst in accordance with the invention.

Example 3

Supported CoMo Catalyst with a Co/Mo Ratio of About 0.50 Atoms/Atom (Comparative)

A catalyst identical to catalyst A of Example 1 but with a higher Co/Mo atomic ratio was prepared using the method described in Example 1. For this non-sulphided Co—$MoO_3$/$Al_2O_3$ catalyst, the molybdenum oxide content was 16.3% and the cobalt oxide content was 4.1%, corresponding to a real Co/Mo ratio of 0.48 atoms/atom. This catalyst C was representative of an industrial catalyst and was not in accordance with the invention.

Example 4

Supported CoMo Catalyst Prepared from $(CO_2Mo_{10}O_{38}H_4)Co_3$ and with a Co/Mo Ratio of 0.50 Atoms/Atom (in Accordance with the Invention)

The heteropolyanion was initially prepared in the form of the ammonium salt using the following method:

75 g of $(NH_4)_6Mo_7O_{24}$, $4H_2O$ (0.061 mole) was dissolved in 225 cm³ of $H_2O$ (colourless solution). A solution obtained with 15.5 g of $Co(CH_3COO)_2$, $4H_2O$ (0.062 mole) dissolved in 400 cm³ of water (pink colour) was added to said solution. 15 g of activated charcoal, then 100 cm³ of 18% $H_2O_2$ (black colour, immediate release of gas and heat) was added to the mixture obtained. After boiling for 1 hour, the solution was filtered to eliminate the charcoal, and the filtrate (blackish green) was placed in a crystallizer in the refrigerator. After three days, black crystals of $(NH_4)_6Co_2Mo_{10}O_{38}H_4$, $7H_2O$ were recovered and allowed to dry in air.

The cobalt salt of phosphomolybdic acid, $Co_{3/2}PMo_{12}O_{40}$, was prepared using the method described in Example 2.

8.04 g of the ammonium salt $Co_2Mo_{10}O_{38}H_4(NH_4)_6$ was dissolved in 100 ml of water at 50° C. to obtain an approximately 0.05 M solution. Then 17.85 g of $Co_{3/2}PMo_{12}O_{40}$ was added. The solution was stirred at 50° C. for 2 hours (milky yellow colour). After cooling to ambient temperature and filtering through a frit to separate the precipitate of $(NH_4)_3PMo_{12}O_{40}$ (bright yellow), the solution of the cobalt salt $Co_3Co_2Mo_{10}O_{38}H_4$ (very dark green) was allowed to crystallize in the refrigerator.

A sufficient quantity of the salt obtained was then dissolved to form a 1.78 mole/l solution of Mo. This solution was dry impregnated into a commercial γ $Al_2O_3$ alumina support. After maturing for 2 hours, the extrudates were dried overnight at 100° C., then calcined in oxygen at 500° C. for 4 hours. For the non-sulphided $CoMo/Al_2O_3$ catalyst, the molybdenum oxide content was 16.1% and the cobalt oxide content was 4.2%, corresponding to a real Co/Mo ratio of 0.50 atoms/atom. This catalyst D was representative of a CoMo catalyst in accordance with the invention.

Example 5

Supported NiMo Catalyst with a Ni/Mo Ratio of About 0.50 Atoms/Atom (Comparative)

A catalyst identical to catalyst A of Example 1 but in which the cobalt nitrate had been replaced with nickel nitrate was prepared using the method described in Example 1. For this non-sulphided Ni—$MoO_3/Al_2O_3$ catalyst, the molybdenum oxide content was 9.2% and the nickel oxide content was 2.3%, corresponding to a real Co/Mo ratio of 0.48 atoms/atom. This catalyst E was representative of an industrial catalyst and was not in accordance with the invention.

Example 6

Supported NiMo Catalyst Prepared from $(NiMo_6O_{24}H_6)Ni_2$ and with a Ni/Mo Ratio of 0.5 Atoms/Atom (in Accordance with the Invention)

The heteropolyanion was initially prepared in the form of the ammonium salt using the following method:

166.72 g of $(NH_4)_6Mo_7O_{24}$, $4H_2O$ (0.135 mole) was dissolved in 1403 cm$^3$ of $H_2O$ in a 2 litre flask (colourless solution). The solution was heated to 95° C., then added to a solution obtained at ambient temperature with 23.571 g of $Ni(NO_3)_2$, $6H_2O$ (0.081 mole) and 10.8 g of 30% $H_2O_2$, made up to 160 cm$^3$ with water. The solution obtained was evaporated with stirring until a volume of about 800 ml of solution remained. After leaving for 12 hours at ambient temperature, a precipitate was observed: $NiMo_6O_{24}H_6(NH_4)_4$, which was then filtered and dried through a frit to obtain the bulk salt $NiMo_6O_{24}H_6(NH_4)_4$.

17.3 g of phosphomolybdic acid $H_3PMo_{12}O_{40}$, $13H_2O$ (0.008 mole) was dissolved in 75 cm$^3$ of $H_2O$ at ambient temperature (translucent yellow colour). 3.924 g of $Ba(OH)_2$, $8H_2O$ (0.012 mole) was added to this solution which was then stirred for about ½ hour (no colour change) before adding 3.372 g of $NiSO_4$, $7H_2O$ (0.012 mole). The solution obtained was stirred for 2 hours before being filtered through a frit to separate out the precipitate of $(NH_4)_3PMo_{12}O_{40}$ (yellowish white) from the solution of $Ni_{3/2}PMo_{12}O_{40}$. The $Ni_{3/2}PMo_{12}O_{40}$ solution was placed in the refrigerator to crystallize and the crystals were recovered as they formed and allowed to dry in air to produce the hydrate $Ni_{3/2}PMo_{12}O_{40}$, $13H_2O$.

5.42 g of the ammonium salt $NiMo_6O_{24}H_6(NH_4)_4$ was dissolved in 100 ml of water at 50° C. to obtain an approximately 0.05 M solution. 6.44 g of $Ni_{3/2}PMo_{12}O_{40}$ was then added and the solution was stirred at 50° C. for 2 hours. After cooling to ambient temperature and filtering through a frit to separate the precipitate of $(NH_4)_3PMo_{12}O_{40}$ (bright yellow), the solution of the nickel salt $Ni_2NiMo_6O_{24}H_6$ was left in the refrigerator to crystallize.

A sufficient quantity o f the s alt obtained w as then dissolved to form a 1.08 mole/l solution of Mo. This solution was dry impregnated into a commercial γ $Al_2O_3$ alumina support. After maturing for 2 hours, the extrudates were dried overnight at 100° C. then calcined in oxygen at 500° C. for 4 hours. For the non-sulphided $NiMo/Al_2O_3$ catalyst, the molybdenum oxide content was 9.2% and the nickel oxide content was 2.4%, corresponding to a real Ni/Mo ratio of 0.5 atoms/atom. This catalyst F was representative of a NiMo catalyst in accordance with the invention.

Example 7

Supported CoMoP Catalyst Prepared from the Salt $PCoMo_{11}O_{40}H(CO)_3$ in Accordance with FR-A-2 764 211 (Not in Accordance with the Invention)

A catalyst G was prepared following the description in FR-A-2 764 211. Crystals of $PCoMo_{11}O_{40}H(NH_4)_6$, $xH_2O$ were prepared from a solution of ammonium heptamolybdate cooled to 0° C. into which a solution comprising phosphoric acid, sulphuric acid and cobalt sulphate was added dropwise. After adding ammonium nitrate to this mixture, the brown salt $PCoMo_{11}O_{40}H(NH_4)_6$ precipitated out. After filtering, the solid recovered was dried on a filter and stored at 0° C. Then 5 g of said crystals was added to 15 ml of a 1M solution of tetramethylammonium chloride. After stirring the mixture for 5 minutes, a solid with formula $PCoMo_{11}O_{40}H(N(CH_3)_4)_6$, $13H_2O$ was recovered. 4.36 g of this compound was added to 11.7 ml of a 0.45 M solution of $CoClO_4$. Following gentle heating, a paste was obtained, which was allowed to decant for several hours after stopping stirring, at about 5° C. The precipitate was filtered and the brown solution containing the compound with formula $PCoMo_{11}O_{40}H(Co)_3$ was recovered.

The alumina of Example 1 was then dry impregnated with a solution comprising the salt $PCoMo_{11}O_{40}H(Co)_3$ in the desired proportions.

After maturing under argon at ambient temperature for 2 hours, the solid was dried in dry air at 80° C. for 12 hours then calcined in nitrogen at 400° C. for 4 hours.

For the non-sulphided Co—$MoO_3P/Al_2O_3$ catalyst, the molybdenum oxide content was 15.8% and the cobalt oxide content was 3.0%, corresponding to a real Co/Mo ratio of 0.36 atoms/atom. This catalyst also contained 1.1% by weight of $P_2O_5$. This catalyst G was not in accordance with the invention.

Example 8

Analysis of Catalysts in Dry State

The catalysts prepared in Examples 1 to 7 containing the group VIII element and molybdenum in the form of heteropolyanions were analyzed in the dry state using K edge X ray absorption spectroscopy for the group VIII element it contained (Ni or Co). The X ray absorption spectra were recorded at 1000 eV around the energy of the nickel or cobalt absorption edge under the conditions described above in the description. The results of the treatment of the spectra for the different samples are shown in Table II. We have shown the distances between the group VIII element A and molybdenum, and the number of neighbouring molybdenum atoms of element A for each of the catalysts prepared in Examples 1 to 7.

In general, for all of the bulk solids and the supported catalysts of the invention, following treatment by X ray spectroscopy, the group VIII element displayed more than two molybdenum neighbours at a distance of 3.6 Å or less. These results bear witness to the very strong interaction between the element A from group VIII, namely cobalt or nickel, and the molybdenum in catalysts B, D and F.

TABLE II

Results of treatments of K edge X ray absorption spectra for group VIII element A (A = Ni or Co).

| catalyst | catalyst characteristics | d(A-Mo) (Å) | number of Mo neighbours |
|---|---|---|---|
| A | CoMo: Co/Mo = 0.43, 8.3% $MoO_3$ (outside invention) | d > 3.6 | — |
| B | CoMo: Co/Mo = 0.41, 9.9% $MoO_3$ (invention) | 3.40 | 2.61 |
| C | CoMo: Co/Mo = 0.48, 16.3% $MoO_3$ (outside invention) | d > 3.6 | — |
| D | CoMo: Co/Mo = 0.5, 16.1% $MoO_3$ (invention) | 3.29 | 2.46 |
| E | NiMo: Ni/Mo = 0.48, 9.2% $MoO_3$ (outside invention) | d > 3.6 | — |
| F | NiMo: Ni/Mo = 0.5, 9.2% $MoO_3$ (invention) | 3.38 | 2.57 |
| G | CoMoP: Co/Mo = 0.36, 15.8% $MoO_3$, 1.1% $P_2O_5$ (outside invention) | d > 3.6 | — |

Example 9

Thiophene Hydrodesulphurization Test (Model Sulphur-Containing Molecule)

The various catalysts prepared in Examples 1 to 7 were sulphurized in a $H_2$—$H_2S$ stream containing 10 mole % $H_2S$ with a temperature rise of 360° C./hour then a constant temperature stage at 400° C. for 2 hours with a gas flow rate of 30 l/h/g of catalyst. This sulphurization was carried out in situ before carrying out the catalytic test in a fixed traversed bed reactor at atmospheric pressure. After sulphurization, the furnace was cooled to 300° C. in a stream of sulphurizing mixture then the catalyst was placed in a stream of thiophene/$H_2$. The saturated vapour pressure of the thiophene, which was in a tank at 14.5° C., was 50 torrs. It was entrained by the hydrogen and the fraction of thiophene in the gas mixture was 6.6%. The gas flow rate was 6 l/h/g of catalyst. We were careful to compare the 7 catalysts using the same catalytic test unit so as not to falsify the comparisons by using different tools for the catalytic test which could generate discrepancies in the results.

The catalysts were compared on the basis of the thiophene conversion ratio (Table III).

TABLE III

Thiophene conversion ratio

| catalyst | catalyst characteristics | % thiophene conversion |
|---|---|---|
| A | CoMo: Co/Mo = 0.43, 8.3% $MoO_3$ (outside invention) | 22 |
| B | CoMo: Co/Mo = 0.41, 9.9% $MoO_3$ (invention) | 27 |
| C | CoMo: Co/Mo = 0.48, 16.3% $MoO_3$ (outside invention) | 23 |
| D | CoMo: Co/Mo = 0.5, 16.1% $MoO_3$ (invention) | 38 |
| E | NiMo: Ni/Mo = 0.48, 9.2% $MoO_3$ (outside invention) | 25 |
| F | NiMo: Ni/Mo = 0.5, 9.2% $MoO_3$ (invention) | 30 |
| G | CoMoP: Co/Mo = 0.36, 15.8% $MoO_3$, 1.1% $P_2O_5$ (outside invention) | 32 |

It can be seen that the catalysts in which, in the dry state, cobalt or nickel is present in the form of a heteropolyanion in the oxide precursor with one of structures I, I', I", I''' or I'''' were more active than the conventional catalysts. This is the case if we compare catalyst B with catalyst A. It is also true at a higher CoMo content (catalysts D/C) or with nickel (catalysts F/E). The heteropolyanions with structures I, I', I", I''' or I'''' used to prepare the catalysts of the invention also produce catalysts that are more active than those that can be prepared with heteropolyanions that have already been described in the prior art, for example in FR-A-2 764 211 (catalyst G). For the same amount of active phase and despite the presence of phosphorus, which is known to be a dopant for catalytic activity, catalyst G was less active than catalyst D in accordance with the invention in which there are more than two Mo atoms at less than 3.6 Å (actually 3.29 Å) from the cobalt atoms.

Example 10

Gas Oil HDS Test

The catalytic activity of catalyst D of the invention was determined by carrying out HDS on a gas oil and its performance was compared with that of catalyst C, not in accordance with the invention (Table IV). The gas oil had the following characteristics:

| | |
|---|---|
| Density at 15° C. | 0.8522 |
| Sulphur | 1.44% by weight |
| Simulated distillation | |
| IP | 155° C. |
| 10% | 247° C. |
| 50% | 315° C. |
| 90% | 392° C. |
| EP | 444° C. |

The test was carried out in a fixed traversed isothermal bed pilot reactor with the fluids moving from bottom to top. After in situ sulphurization at 350° C. in the unit pressurized with the gas oil for the test to which 2% by weight of dimethyldisulphide had been added, the hydrodesulphurization test was carried out under the following operating conditions:

| | |
|---|---|
| Total pressure | 4 MPa |
| Catalyst volume | 30 cm³ |
| Temperature | 340° C. |
| Hydrogen flow rate | 24 l/h |
| Feed flow rate | 60 cm³/h |

The catalytic performances of the test catalysts are shown in Table IV. They are expressed as the relative activity, assuming that that of catalyst C, not in accordance with the invention, was equal to 100 and assuming an order of 1.5. The relationship connecting activity and conversion (%HDS) is as follows:

$$A_{HDS} = [100/(100-\% HDS)]^{0.5} - 1$$

TABLE IV

Activity of catalysts in gas oil hydrodesulphurization

| catalyst | $A_{HDS}$ relative to C |
|---|---|
| C | 100 |
| D | 135 |

Table IV shows the large gain in activity obtained for the CoMo catalyst of the invention (catalyst D) compared with the reference catalyst containing no strong interactions between the cobalt and the molybdenum in the oxide precursor (catalyst C).

Example 11

Vacuum Distillate HDN Test

The catalytic activity of catalyst F of the invention was studied by carrying out HDN and HDS on a vacuum distillate and its performance was compared with that of catalyst E, which was not in accordance with the invention. The principal characteristics of the vacuum distillate used were as follows:

| | |
|---|---|
| Density at 15° C. | 0.9365 |
| Sulphur | 2.92% by weight |
| total nitrogen | 1400 ppm by weight |
| Simulated distillation | |
| IP | 361° C. |
| 10% | 430° C. |
| 50% | 492° C. |
| 90% | 567° C. |
| EP | 598° C. |

The test was carried out in a fixed traversed isothermal bed pilot reactor with the fluids moving from bottom to top. After in situ sulphurization at 350° C. in the unit pressurized with a straight run gas oil to which 2% by weight of dimethyldisulphide had been added, the hydrodesulphurization test was carried out under the following operating conditions:

| | |
|---|---|
| Total pressure | 12 MPa |
| Catalyst volume | 40 cm³ |
| Temperature | 380° C. |
| Hydrogen flow rate | 40 l/h |
| Feed flow rate | 40 cm³/h |

The catalytic performances of the test catalysts are shown in Table V. They are expressed as the relative activity, assuming that that of catalyst E was equal to 100 and assuming an order of 1.5. The relationship connecting activity and conversion (%HDS) is as follows:

$$A_{HDS} = [100/(100-\% HDS)]^{0.5} - 1$$

The same relationship applies for hydrodenitrogenation (% HDN and $A_{HDN}$).

TABLE V

Activity of catalysts in vacuum distillate hydrotreatment

| catalyst | $A_{HDS}$ relative to E | $A_{HDN}$ relative to E |
|---|---|---|
| E | 100 | 100 |
| F | 140 | 125 |

Table V shows the large gain in activity obtained for the CoMo catalyst of the invention (catalyst F) compared with the reference catalyst in which the Ni and Mo are only weakly associated in the oxide precursor (catalyst E).

Example 12

Selective HDS Test (Model Molecule Test Representing Selective HDS of a Gasoline Cut Produced by Catalytic Cracking)

The catalytic activity of catalyst D of the invention was studied by carrying out HDS of a model feed representing a gasoline cut from a catalytic cracking process and its performance was compared with that of catalyst C, not in accordance with the invention. The test was carried out in a (batch) Grignard reactor at 200° C. at a constant pressure of 2.5 MPa of hydrogen. The model feed was constituted by 1000 ppm of 3-methylthiophene and 10% by weight of 2,3-dimethyl-2-butene in n-heptane. The volume of the solution was 150 cm³ in the cold; the weight of the test catalyst being 4 grams (before sulphurizing). Before the test, the catalyst was sulphurized in a sulphurizing bench with a $H_2S/H_2$ mixture (4 l/h, 15% by volume of $H_2S$) at 500° C. for two hours (5° C./min temperature rise), then reduced in pure $H_2$ at 200° C. for two hours. The catalyst was then transferred to the Grignard reactor protected from air.

The rate constant (normalized to per gram of catalyst) was calculated, assuming an order of 1 for the desulphurization reaction ($k_{HDS}$), and zero order for the hydrogenation reaction ($k_{HDO}$). The selectivity of the catalyst was defined as the ratio of these rate constants, $k_{HDS}/k_{HDO}$. The relative rate constants of catalysts C and D and their selectivity are shown in Table VI below.

TABLE VI

Rate constants relative to C and selectivity of catalysts C and D

| catalyst | $k_{HDS}$ | $k_{HDO}$ | $k_{HDS}/k_{HDO}$ |
|---|---|---|---|
| C | 1 | 1 | 0.40 |
| D | 1.57 | 0.79 | 0.50 |

It can be seen that catalyst D in which, in the dry state, the cobalt and molybdenum are present in the form of a heteropolyanion in the oxide precursor with one of structures I, I', I'', I''' or I'''' is both more active in hydrodesulphurization and also more selective in hydrodesulphurization than catalyst C with the same composition but not in accordance with the invention.

Example 13

HDS Residue Test

The catalytic activity of catalyst B of the invention was studied by carrying out HDS on a vacuum residue that had been demetallized and its performance was compared with that of catalyst A, not in accordance with the invention. The feed used was an Arabian light (Aramco) vacuum distillate that had been partially demetallized using a hydrodemetallization catalyst.

The principal characteristics of this demetallized residue are shown in the table below:

|   | demetallized vacuum residue |
|---|---|
| 15/4 density | 0.989 |
| sulphur (% by weight) | 2.3 |
| Ni (ppm by weight) | 12 |
| V (ppm by weight) | 18 |
| C7 asphaltenes (weight %) | 3.9 |
| Conradson carbon CCR (weight %) | 14 |
| N (ppm by weight) | 3600 |

This feed was treated in an oil residue hydrotreatment pilot unit comprising a fixed bed reactor functioning in upflow mode.

After a sulphurization step, by circulating a vacuum distillate containing 2% by weight of sulphur in the reactor at a final temperature of 350° C., the unit was operated with the partially demetallized atmospheric residue described above. The operating conditions employed at the start of the test were as follows:

| Total pressure | 15 MPa |
|---|---|
| Temperature | 370° C. |
| hourly space velocity of residue | 0.5 h$^{-1}$ |
| H$_2$/HC flow rate ratio | 1000 |
| catalyst volume (cm$^3$) | 40 |

After stabilizing for 300 hours, the hydrodesulphurization performance (HDS) and CCR reduction performance (HDCCR) were calculated as follows:

HDS (wt %)=((S wt %)feed−(S wt %) test)/ S weight % feed×100

HDCCR (wt %)=((CCR wt %)feed−(CCR wt %) test)/CCR wt % feed×100

Table VII compares the performances of catalysts A and B for HDS and HDCCR of said residue:

TABLE VII

| catalytic system | HDS (wt %) | HDCCR (wt %) |
|---|---|---|
| catalyst A | 83 | 39 |
| catalyst B | 88 | 43 |

It can be seen that catalyst CoMo (B) of the invention containing cobalt and molybdenum in the dry state and interacting strongly in the form of a heteropolyanion results, after sulphurization, in a catalyst that is more active than conventional catalyst A with the same chemical composition but not in accordance with the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding French application No. 0209840, filed 1 Aug. 2002 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst containing at least one group VIII element and at least molybdenum and/or tungsten, said elements being present at least in part in the catalyst in the dry state in the form of at least one heteropolyanion having a structural formula $M_xAB_6O_{24}H_6C_{(3-2x)}.tH_2O(I); M_xAB_6O_{24}H_6C_{(4-2x)}.tH_2O(I'); M_xA_2B_{10}O_{38}H_4C_{(6-2x)}.tH_2O; M_xA_2B_{10}O_{38}H_4C_{(8-2x)}.tH_2O(I'''); $ or $M_xA_2B_{10}O_{38}H_4C_{(7-2x)}.tH_2O(I'''');$ wherein M is cobalt, nickel, iron, copper, zinc, or mixtures thereof, A is an element of group VIII of the periodic table for formulae I and I' or one or elements of group VIII of the periodic table for formulae I'', I''', and I'''', B is molybdenum and/or tungsten and C is an H$^+$ ion and/or a $(NR_1R_2R_3R_4)^+$ type ammonium ion, wherein $R_1$, $R_2$, $R_3$ and $R_4$, may be identical or different, and correspond either to a hydrogen atom or to an alkyl group, cesium, potassium, sodium or mixtures thereof, t is a number from 0 to 15 and x is 0 to 3/2 in (I), 0 to 2 in (I'), 0 to 3 in (I''), 0 to 4 in (I''') and 0 to 7/2 in (I'''') and wherein the number of bonds connecting the group VIII element or elements with the molybdenum and/or tungsten having a length of 3.6 angstroms or less is greater than 2.

2. A catalyst according to claim 1, wherein more than 2 bonds connecting the group VIII element or elements with the molybdenum and/or tungsten have a length of 3.5 angstroms or less in the catalyst in the dry state.

3. A catalyst according to claim 1, wherein element A is selected from the group consisting of nickel, cobalt and iron.

4. A catalyst according to claim 1 comprising, in the dry state, 0.01% to 100% by weight with respect to the total catalyst weight of at least one heteropolyanion with a structural formula selected from the group consisting of formulae I, I', I'', I''' and I''''.

5. A catalyst according to claim 1, comprising at least one porous mineral matrix.

6. A catalyst according to claim 5, further comprising a zeolitic molecular sieve.

7. A catalyst according to claim 5 comprising, in the dry state, as a % by weight with respect to the total catalyst weight, 1% to 99.9% of at least one porous mineral matrix, 0.1% to 99% by weight of at least one heteropolyanion having a structural formula selected from the group consisting of formulae I, I', I'', I''' and I'''' and 0 to 80% by weight of at least one zeolitic molecular sieve.

8. A catalyst according to claim 1, wherein the heteropolyanion has a structural formula selected from the group consisting of $Co_3Co_2Mo_{10}O_{38}H_4$, $Ni_{3/2}CoMo_6O_{24}H_6$, $Co_2CoMo_6O_{24}H_6$, $Ni_3Co_2Mo_{10}O_{38}H_4$, $Co_4Ni_2Mo_{10}O_{38}H_4$, $Co_2NiMo_6O_{24}H_6$, $Ni_2CoMo_6O_{24}H_6$, $Co_{3/2}CoMo_6O_{24}H_6$, and $Ni_2NiMo_6O_{24}H_6$.

9. A catalyst according to claim 8, wherein the heteropolyanion is $Co_2Mo_{10}O_{38}H_4Co_3$, $CoMo_6O_{24}H_6Ni_{3/2}$, or $NiMO_6O_{24}H_6Ni_2$.

10. A catalyst according to claim 1, which has undergone a sulphurization treatment.

11. In a catalytic process comprising hydrorefining and/or hydroconverting a hydrocarbon feed, the improvement wherein subjecting said feed to hydrorefining and/or hydroconverting conditions in the presence of the catalyst according to claim 1.

12. A catalytic process according to claim 11 comprising conducting hydrogination, hydrodenitrogenation, hydrodeoxygenation, hydrodearomatization, hydrodesulphurization, hydrodemetallization, hydroisomerization, hydrodealkylation or dehydrogenation reactions.

13. A catalytic process according to claim 11, wherein said hydrocarbon feed contains at least one heteroatom.

14. In a catalytic process comprising hydrocracking of a hydrocarbon feed, the improvement wherein subjecting said feed to hydrocracking conditions in the presence of the catalyst according to claim 1.

* * * * *